Figure 1:
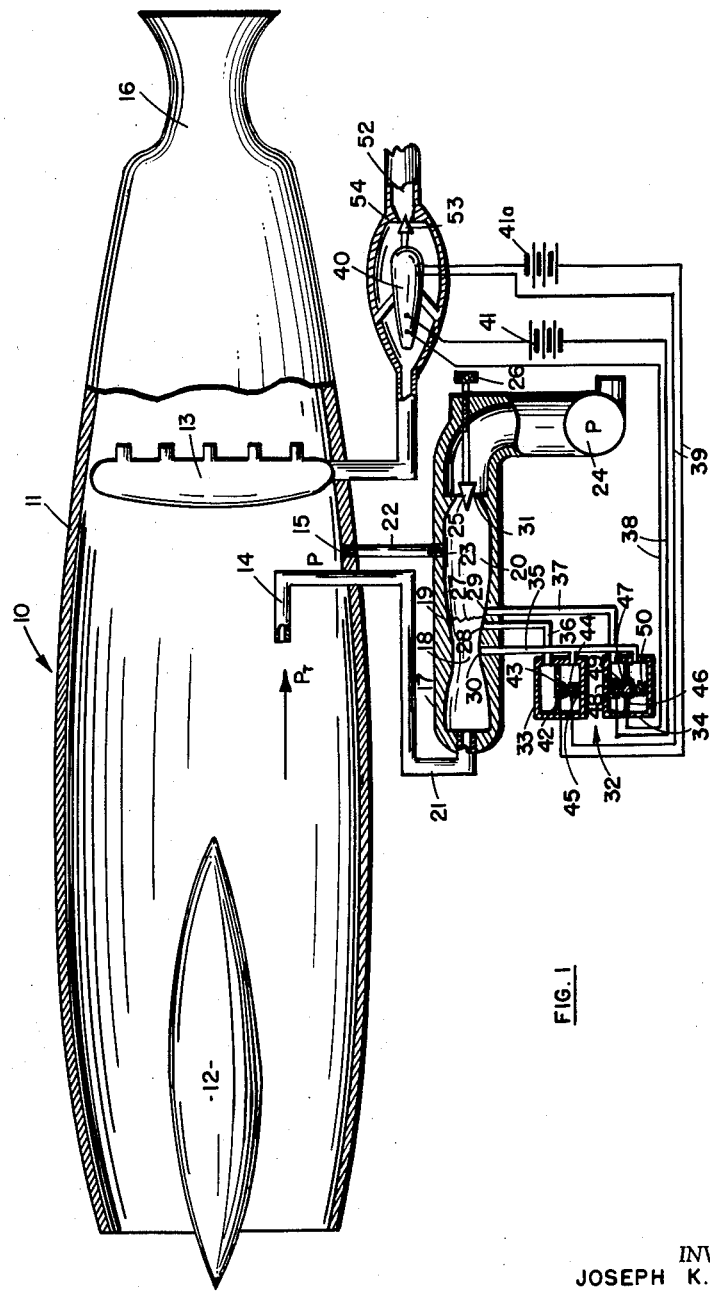

Nov. 27, 1962

J. K. DEW 3,065,599

CONTROL PRESSURE AMPLIFIER AND SYSTEM

Filed Jan. 26, 1959

2 Sheets-Sheet 1

INVENTOR.
JOSEPH K. DEW

BY *Noel S Conway*

ATTORNEY

Nov. 27, 1962   J. K. DEW   3,065,599
CONTROL PRESSURE AMPLIFIER AND SYSTEM
Filed Jan. 26, 1959   2 Sheets-Sheet 2
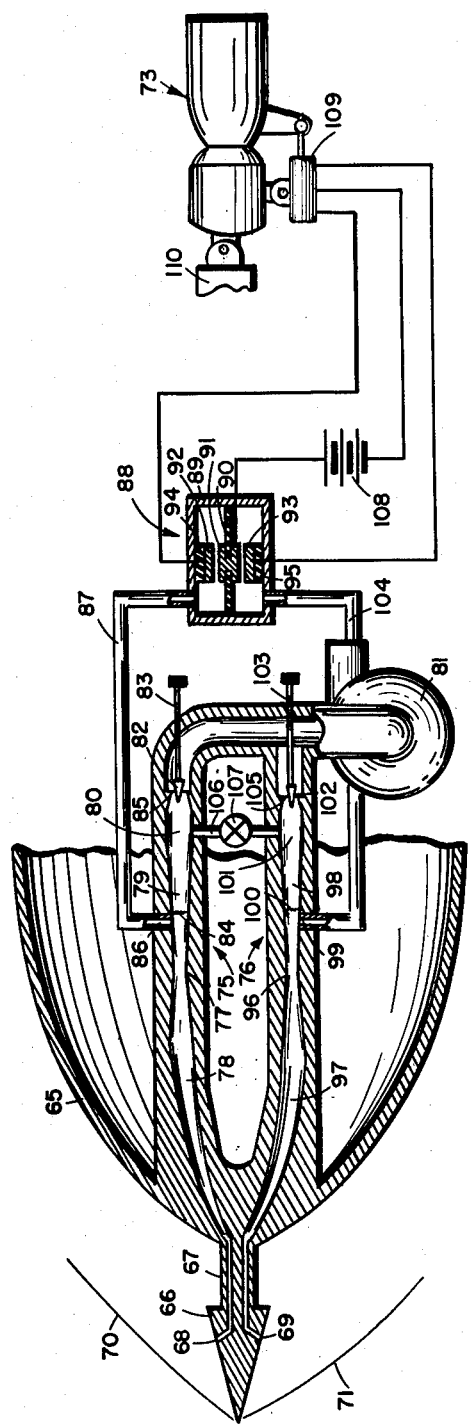
INVENTOR.
JOSEPH K. DEW
BY Noel G. Conway
ATTORNEY

United States Patent Office 3,065,599
Patented Nov. 27, 1962

3,065,599
CONTROL PRESSURE AMPLIFIER AND SYSTEM
Joseph K. Dew, La Habra, Calif., assignor to North American Aviation, Inc.
Filed Jan. 26, 1959, Ser. No. 789,189
4 Claims. (Cl. 60—39.28)

This invention relates to a system which uses a pressure amplifier.

More particularly this invention relates to a control pressure amplifier for use in a control system which is capable of using very small pressure changes and converting them to higher pressure changes which will operate rugged, pressure-operated electrical switches.

It is becoming increasingly important that aircraft be able to fly higher and faster than ever before and this has led to considerable control problems. The presently available electrical motors and hydraulic power devices are suitable to control the position of wing tabs or fuel throttle valves, however the lack of suitable sensing devices to actuate such power devices is a serious obstacle. Some of the presently available electrical controls will operate satisfactorily, but these devices have the disadvantages that they are expensive and often add a considerable amount of dead weight to the aircraft. Further, it is commonly known in the aircraft field that such devices are often subject to component failure and are not reliable.

At lower altitudes, pneumatic devices have been found to be satisfactory since the pressures available are usually sufficient to actuate the power means in response to changes in pressure which are sensed. Such systems have the advantage that normally they are very simple in construction and are inherently rugged which are important attributes in order to operate satisfactorily in the vibration which accompany flight. However, relatively stiff operating switches must be used in aircraft because of the vibration of the environment and at the extremely high altitudes which it is presently desired to operate the air pressures available are not enough to satisfactorily operate such switches.

The present invention overcomes these disadvantages. The basic portion of this invention is the pressure amplifier which can convert very small changes in the relation of two sensed quantities into a large change in gas pressure. This large change in pressure is then large enough to operate presently available actuating means which then operates a control means or device. The amplifier is particularly useful in that it is able to compare two quantities sensed. This allows it to be used in feedback systems where one input to the amplifier is from a device such as a manually operated fluid valve while the other input is a quantity dependent on the position or operation of the control means. As will be disclosed this invention operates on pneumatic principles and therefore has the advantages of a pneumatic system. This control pressure amplifier also has the advantages that there are no moving parts, as well as being very rugged and inexpensive to produce.

Therefore, it is an object of this invention to provide a control pressure amplifier.

It is also an object of this invention to provide a means for amplifying the deviation of two measured quantities from a predetermined ratio.

It is a further object of this invention to provide a pneumatic means for amplifying the deviation from a predetermined ratio of a first gas pressure fed to the means and a second gas pressure fed to the means.

Still another object of this invention is to provide an amplifier which will sense two pressures and will amplify any change in the ratio of these two pressures.

It is a further object of this invention to provide a control pressure amplifier which has no moving parts.

Another object of this invention is to provide a control system which responds to amplified control pressures to maintain a predetermined ratio between two pressures which are fed to the system amplifier.

Other and further objects will become apparent in the detailed description below wherein:

FIG. 1 shows one modification of the subject control pressure amplifier as used in an illustrative control system;

FIG. 2 discloses a modification of the subject invention having a variable throat; and FIG. 3 shows a second modification of the control pressure amplifier incorporated in another illustrative control system.

Although the subject invention can be used in any one of a number of systems FIG. 1 shows a first modification of the subject invention as used in conjunction with a jet engine fuel control system. The jet engine referred to generally by the arrow 10 has the conventional outer duct wall 11 with a diffuser 12 located at the forward end of the jet engine. Similarly the jet engine is provided with fuel injection nozzle 13 shown schematically and the exhaust nozzle 16. A total pressure probe 14 and a static pressure probe 15 are provided within the engine duct and are used to control the operation of the engine. As known in the art the ratio of the total pressure to the static pressure within an engine duct may be used to control fuel flow to the engine duct and maintain the combustion processes at the most efficient level. The particular fuel system shown in FIG. 1 was designed for a missile which will cruise over a long distance at a constant altitude and constant velocity. In such case it is desirable to retain the ratio of the total pressure measured at 14 to the static pressure measured at orifice 15 at the predetermined ratio and use any deviation therefrom to control the fuel flow into the engine.

Referring more directly to the control pressure amplifier it is seen that amplifier conduit 17 is provided with a throat 18 and that the conduit passageway has a diverging section 19 which terminates in the constant area section 20 downstream of the throat. Also provided are means to cause the throat 18 to operate in a "choked" condition, i.e. cause the gas flow through the throat 18 to become supersonic for at least part of section 19. In this case, such means comprise a vacuum centrifugal pump 24 in combination with a needle valve 25 which is variably mounted in the conduit 17 by means of threaded stem 26. An alternative method of causing the throat to become "choked" is to provide a conduit leading to a low pressure chamber from the constant area portion 20 of the conduit 17. Tube 21 connects the upstream end of the throat 18 to the total pressure probe 14, in order to supply gas pressure which is indicative of a quantity sensed to the throat. In this embodiment the quantity sensed or measured is the pressure at the pressure probe 14, however, in some situations it is desirable to sense some quantity and then convert that quantity into pneumatic pressure proportional to the quantity measured and feed that pressure to the upstream side of the throat. A second tube 22 is connected into the constant area section 20 at the orifice 23 in order to supply gas pressure downstream of the diverging section 19 which is indicative of a second sensed quantity i.e., the pressure sensed at static orifice 15. For clarity the amplifier conduit 17 is shown much larger in relation to conduits 21 and 22 than it actually is. With the apparatus so far described it is seen that air within the tube 21, which is moving at a very low speed, becomes supersonic in the diverging section 19 due to the low pressure which is caused by the pump 24. By regulating the position of the needle valve 25 the size of the exit orifice 31 and therefore the amount of the back pressure in the constant area section 20 can be varied in order that a normal shock wave 27 is formed in the diverging section. More specifically when the ratio of the pressure in the section 20 to the pressure in tube 21 is increased the normal shock wave is moved forward, in the diverging section 19 and vice versa. The exact position of this normal shock is dependent upon the relation of ratio between the pressure of the air in tube 21 and the pressure in the constant area section 20 downstream of the throat. It can be seen that the position of the normal shock 27 within the diverging section is an indication of the ratio of the pressure upstream as compared to the pressure downstream of the throat 18, and therefore means are provided to sense the position of the shock and use this input to control the operation of the jet engine.

A means to sense the position of the normal shock 27 includes a first static orifice 28 in said diverging section 19 and a second static orifice 29 spaced longitudinally downstream in said diverging section from said orifice 28. A third static orifice 30 is provided at the throat section 18 where the air speed is mach 1 no matter where the normal shock wave 27 is located in order to supply a reference pressure. The pressures measured at the orifices 28, 29 and 30 are supplied to pressure responsive actuating means indicated generally by the arrow 32 which are sensitive to the difference in the static pressure in front of and behind a normal shock wave 27 in the diverging section 19. In this modification the pressure responsive actuating means take the form of pressure switches 33 and 34 which are connected to the respective static orifices by the tubes 36, 37 and 35. Electrical wires 38 and 39 connect the pressure switches 34 and 33 respectively to a power means for actuating a control device. In this particular embodiment the power means is a reversible motor 40 which is driven in one direction when the circuit containing battery 41 is closed and in the opposite direction when the circuit containing battery 41a is closed.

The pressure switches are conventional and are relatively stiff in order to operate in the vibration accompanying flight. Switch 33 has a flexible diaphragm 42 with contact 43 mounted on it and connected to one of the wires 39. Juxtaposed to the contact 43 is contact 44 which is insulated from the housing of the switch 33 by an insulation block 45. Contact 44 is also connected up to the other of the wires 39 in order that the circuit be completed when the contacts 43 and 44 are closed. The pressure switch 33 is adjusted so that when the normal shock wave 27 is located to the rear of the orifice 28 the contacts 43 and 44 will be open. However, when the normal shock moves forwardly of the orifice 28 the increased static pressure behind the normal shock will depress the diaphragm 42 downwardly closing the contacts 43 and 44. Pressure switch 34 is similarly constructed and it is provided with flexible diaphragm 46 having contact 47 mounted thereon. Juxtaposed to the contact 47 is located contact 48 which is mounted to and insulated from the housing of the switch 34 by insulation block 49. Also provided is spring 50 which normally urges the contacts 47 and 48 closed. Switch 34 is adjusted so that when the normal shock wave 27 is in front of the orifice 29 the higher static pressure downstream of the normal shock wave 27 is sufficient to hold the contacts 47 and 48 apart. However, if the normal shock wave 27 moves downstream of the orifice 29 the pressure in the chambers of the pressure switch 34 will equalize and the spring 50 will close the contacts. As mentioned above, the difference in the static pressure in front of and behind a normal shock wave is quite large and therefore is sufficient to operate the relatively stiff pressure switches which must be supplied for use in aircraft.

In the fuel system in which the present embodiment is shown a power means, i.e., reversible motor 40, is located within the fuel line 52. The power means drives a control means which in this case is the throttle member 53 which works in combination with the valve seat 54 to vary the flow through the line 52 to the fuel nozzle 13 from a fuel source which is not shown. The control means is able to change the ratio of the quantities measured, i.e., the pressures at probe 14 and orifice 15, as will be described below.

In order to fully understand how the present fuel system works a few basic principles must be explained. First, the pressure indicated by the total pressure probe 14 is dependent mainly upon the pressure of the atmosphere in which the aircraft is flying and slightly upon the position of the normal shock wave within the diffuser section 12 of the engine duct. Second, in normal operation if the fuel flow is increased while the air speed of the missile remains constant the static pressure at the point of the static orifice 15 will rise in relation to the pressure measured by the probe 14 causing the ratio of $p_{t/p}$ to go down. When the fuel supply is decreased the opposite happens. It should also be noted that it only takes a very small change in the pressure upstream of the throat 18 and the constant area section 20 to move the normal shock wave 27 across the static orifices 28 or 29. The amount of change which is necessary is dependent on the rate of divergence of the diverging section 19, or more specifically the difference in cross sectional area of the diverging section at each of the two orifices 28 and 29. As the difference in size increases, the change in pressure required also must increase. Therefore, an amplifier conduit with a slow diverging section is more sensitive than an amplifier conduit with a rapidly diverging section assuming that the orifices equivalent to 28 and 29 are located the same distance apart in either section.

The operation is best explained by asuming, for example, that the fuel flow is too low and the static pressure at orifice 15 becomes lower in relation to the total pressure at probe 14 than the predetermined desired ratio for best engine operation. In such situation, part of the air within the conduit 17 at section 20 will flow through the tube 22 as the pressure within the constant area section 20 tries to equalize itself with the pressure in the engine at the orifice 15. When the pressure in the constant area section 20 is diminished the normal shock 27 will move downstream in the diverging section 19 and will cross the orifice 29 whereby the chamber above the diaphragm 46 will be subjected to the lower static pressure in front of the normal shock and the spring 50 will cause the contacts 47 and 48 to close. This will complete the circuit to the power means 40 and cause it to operate so as to open the throttle valve 53 and increase the fuel flow to the engine. This increased fuel flow will cause the pressure at the orifice 15 to increase and stop the flow of air through the conduit 22 thus increasing the back pressure in the section 20 and causing the normal shock 27 to move forwardly and pick up its normal position between the orifices 28 and 29 in the diverging section 19. Conversely if the ratio of the pressure at orifice 15 to the pressure at probe 14 is too large due to an excess of fuel flow, air will flow through the conduit 22 into the section 20 increasing the pressure downstream of the normal shock 27. This increase in pressure will cause a normal shock 27 to move forward across the orifice 28 and the substantially larger static pressure behind the normal shock will cause the diaphragm 42 to close the contact 43 and 44. As mentioned above, closing the contacts 43 and 44 operate the power device 40 in a direction to close the throttle 53 and diminish the fuel flow to the engine.

FIG. 2 shows a cross section of a modification of the first embodiment of the present invention which will properly adjust in order to enable the control system to vary the pressure ratio which is maintained at different altitudes. In normal operations it is desired that the speed of the gases immediately in front of the fuel injection nozzle 13 be greater at higher altitudes than at the lower altitudes. Therefore, it is desired that the control system be variable so that it will maintain a higher $p_{t/p}$ ratio at the higher altitudes. One means of doing this is to provide that the cross-sectional area of the throat of the amplifier conduit grow smaller while the cross-sectional area at the point of the static orifices in the diverging section grow larger as the altitude is increased. The amplifier conduit shown in FIG. 2 is provided with means to accomplish this result. In this modification the total pressure tube 21a is formed so that it is square in cross-section as it terminates in the amplifier conduit proper. Two fixed flat throat walls 55 are provided. As this figure is a cross-section, only the fixed wall on the far side of the throat is shown. Flexible throat forming walls 55a are slidably mounted between them with the rear end of the flexible walls 55a fixedly mounted to the portion of the amplifier conduit enclosing constant area section 20a as shown. Bell cranks 56 are provided rotatably mounted or pivoted on the shafts 56a and are hingedly connected to the flexible walls 55a by means of pins 57 and 57a as shown. Any of a number of means may be provided to cause the bell cranks 56 to rotate and thereby vary the area of the throat and diverging section. In this case, two pneumatic actuators are used. As the two actuators are substantially the same only the upper one will be described. Cylindrical housing 58 is provided with the piston 59 slidably mounted therein which is connected to the bell crank by means of shaft 59a. Spring 60 is provided in the chamber above the piston 59 and has sufficient strength that the piston 59 is normally urged downwardly towards the throat of the conduit. The chamber below the piston 59 is exposed to atmospheric pressure by means of the conduit 61 while the chamber above the piston 59 is exposed to some vacuum source such as the vacuum pump 24 by means of a conduit 62. The bell cranks could also be positioned by a reversible motor or hydraulic actuator which is controlled by some standard barometric device. The downstream end of the amplifier conduit is formed substantially the same as the modification of the invention shown in FIG. 1. There is located the constant area section 20a with the orifice 23a which leads through a tube such as 22 in FIG. 1 to the static pressure within the engine duct. Also provided is a needle valve 25a which is variably mounted on the threaded shaft 26a to adjust the size of the exit orifice 31a.

In order to understand the theory of operation let it be assumed that the control system is operating properly and the normal shock 27a within the diverging section is located between the static orifices 28a and 29a and then the missile or aircraft climbs to a higher altitude where it is desired that the speed of the air immediately in front of the fuel injection nozzles 13 is higher. In such case the pressure below the piston 59 becomes less and the piston shaft 59a moves toward the throat of the conduit. The other actuator works in the same way, thereby causing the cross-sectional area of the throat to be diminished while the cross-sectional area of the diverging section at the points at which the static orifices 28a and 29a are located is increased. By reducing the area of the throat without reducing the area of the exit orifice 31a the ratio of the pressure in front of the throat to the pressure in the constant area portion 20a becomes higher as desired. The lower back pressure (in relation to the upstream pressure) tends to cause the normal shock within the diverging section to move downstream to a point where the cross sectional area of the diverging section is larger. However, the length of the arms of the bell cranks 56 are such that the configuration of the diverging section is changed in order that the cross sectional area at the point between the orifices 28a and 29a is enlarged enough so that the normal shock wave will remain between these orifices at the new pressure ratio. Thereby, the control system will strive to maintain a higher $p_{t/p}$ ratio as is desired at the higher altitude.

The presure ratio to be maintained could also be varied in other ways such as providing means to vary the position of the needle valve 25a, and thereby the ratio of the area of the throat to the area of the exit orifice, with altitude, and also providing that the static orifices 28a and 29a may be moved along the diverging section to a point where the cross sectional area is the proper size.

FIG. 3 shows a second modification of the subject invention used in a missile in order to maintain a steady predetermined angle of attack. The figure shows the forward end of a missile 65 which has a fixed wedge probe 66 mounted at its forward end by the support arm 67. The probe 66 has the static pressure orifices 68 and 69 on its two faces respectively which are used to measure the static pressure behind the oblique shock waves 70 and 71 respectively. The missile is shown as it would be flying supersonically with the wedge probe 66 at a zero angle of attack and the oblique shock 70 and 71 extend away from the faces of the wedge probe at equal angle. If the missile were to take on more positive angle of attack orientation the wind would hit the lower side of the probe harder than the upper side and the angle between the oblique shock 71 and the face of the wedge probe 66 would be less than the angle between the oblique shock 70 and the face of the probe. Conversely if the missile took a negative angle of attack the opposite would be true. It is common knowledge that as the oblique shock moves nearer the face of the wedge probe the static pressure measured at the orifices 68 or 69 will increase correspondingly. Therefore, it is seen that an angle of attack control could be made by measuring the differences if any of the pressures measured at orifices 68 and 69. The problem is that due to the high vibration which occurs in aircraft flight stiff pressure switches must be used in order to avoid operating at an improper time, and many times the differences in pressure which are measured are not sufficient to operate these pressure switches in order to control a suitable control device such as the vernier jet indicated generally by the arrow 73. Therefore, some means must be provided to amplify the small changes in the difference in pressure between that which is measured at orifices 68 and 69.

The subject embodiment provides an amplifier conduit indicated generally by the arrow 75 and a second amplifier conduit indicated generally by the arrow 76 in order to amplify the differences in pressure measured at orifices 68 and 69 in a manner which will be described below. As can be seen the first amplifier conduit 75 is provided with a throat section throat 77 which has tube 78 connected to the static pressure orifice 68. This tube 78 constitutes a source of air at a pressure dependent upon the pressure at orifice 68, however, it is within the scope of this invention that the pressure supplied could be dependent on any other quantity desired. For clarity the amplifier conduits 75 and 76 are shown much larger, in relation to conduits 78 and 97 than they actually are. Referring now to the amplifier conduit 75 more specifically it is seen that it is provided with diverging section 79 extending downstream of the throat 77 which terminates in constant area section 80 of the amplifier conduit. In order for the present invention to work it is necessary that some means be provided to cause the throat 77 to operate in choked condition. In the present embodiment a vacuum pump 81 is provided downstream of the constant area section 80, however, it can be seen that any other means which will cause the pressure downstream of the throat to be low enough could be used. In conjunction with the vacuum pump, a throttle member 82 is adjustably mounted on threaded stem 83 for varying the size of the exit orifice 85 in order to regulate the flow through the amplifier conduit 75 in such manner that a normal shock wave 84 forms within the diverging section 79. As will be explained in more detail below very small changes in the ratio of the pressure measured at orifices 68 and 69 will cause the normal shock wave 84 to move a relatively large distance in the diverging section 79 since the section 79 does not diverge very rapidly. Therefore, static orifice 86 is provided in the diverging section 79 as a means to measure the position of the normal shock wave 84. It does this by connecting the static pressure at that point by a tube 87 to a pressure responsive actuating means, indicated generally by the arrow 88, which is sensitive to the difference in pressure behind or in front of a normal shock wave 84.

In this embodiment the pressure responsive actuating means 88 is a pressure switch comprising a housing 89 with a flexible diaphragm 90 mounted as shown. Flexible diaphragm 90 has an electrical contact 91 thereon with electrical contacts 92 and 93 juxtaposed to contact 91. As can be seen contacts 92 and 93 are mounted to the housing 89 by means of insulation members 94 and 95 respectively.

Amplifier conduit 76 is very similar to amplifier conduit 75. This conduit has a throat 96 at its forward end and has a tube 97 extending upstream of the throat to the static orifice 69. Similar to conduit 75, conduit 76 is provided with a diverging section 98 extending downstream from the throat 96 with the static orifice 99 to measure the position of the normal shock wave 100. Constant area portion 101 is located between the diverging section 98 and needle valve 102 which is mounted on threaded stem 103 as shown to vary the size of exit orifice 105. Similar to tube 87, tube 104 connects the static orifice 99 with the pressure responsive means 88 as shown. The static orifices 86 and 99 are shown as being located the same distance downstream of the respective throats with the ratio of the respective throat cross sectional area to cross sectional area of the conduit at the points where the orifices are located being the same. This arrangement will cause the control system to maintain a pressure ratio of 1:1 as measured at orifices 68 and 69. When some other ratio is desired, then the orifices 86 and 99 should be arranged so that relation (or ratio) and the respective ratios of the throat area to the cross sectional area of each of the conduits at the orifices 86 and 99 be equal to that desired ratio. Connecting conduit 106 is located connecting the constant area portions 80 and 101 and is provided with the variable restriction valve 107 in order to regulate the flow of air through the connecting conduit 106. It can be seen that conduit 106 connects the constant area portion 80 and the constant area portion 101 as will be described in more detail below.

Considering the amplifier conduit 75, per se, it is well known in the art that the relative position of the shock 84 with respect to the conduit is solely dependent on the paricular throat 77 to exit orifice 85 ratio and is independent of the changes in pressures occuring at orifice 68. However, with the addition of the second amplifier conduit 76 and connecting conduit 106 thereto, the particular positions of the respective shocks 84 and 100 are made dependent on the particular pressure ratio occurring at orifices 68 and 69, as will be hereinafter more fully explained.

Similar to the first modification, the throat of the amplifier conduits are caused to operate in the choked condition on the ground. This is done by adjusting the throttle members 82 and 102, and thereby the exit orifices 85 and 105, to cause the normal shock waves 84 and 100 to take up their proper position in the diverging sections 79 and 98 respectively. While in flight the positions of the normal shock waves 84 and 100 will remain in their original position even though the pressures measured at orifices 68 and 69 vary as long as the ratio of the pressure at 68 to the pressure at 69 remains the same. During such operation there will not be any flow through connecting conduit 106. This will happen as long as the proper angle of attack is maintained; however, assume that the angle of attack becomes too high and the oblique shock 71 moves closer to the face of the wedge probe 66 while the oblique shock 70 moves away from the other face of the wedge probe 66. In this case the static pressure measured at 68 becomes lower than the static pressure at 69 and the ratio of the two pressures necessarily changes from the designed ratio. Although the static pressure at 69 increases the normal shock 100 will tend to remain in the same position since the pressure in the constant area portion 101 will increase a proportional amount. This is because, as explained above, the ratio of the two pressures at 69 and 101 is solely dependent upon ratio of the area of the throat 96 to the area of the exit orifice 105 when there is no other exit paths such as conduit 106 in the conduit. Similarly, if the connecting conduit 106 were not provided the normal shock 84 would remain in its position because the pressure in the constant area portion 80 would decrease a proportionate amount in order to compensate for the decrease in pressure measured at orifice 68. However, because the pressure in portion 101 is higher than the pressure in portion 80 air flows through conduit 106 into constant area portion 80 downstream of the normal shock 84 causing the pressure in portion 80 to increase since the exit orifice 85 is fixed and the air cannot get out of the portion 80 fast enough. This causes the normal shock 84 to move upstream in the diverging section and cross the static orifice 86. At this time the substantially increased static pressure which is behind the normal shock 84 is supplied through tube 87 to the pressure responsive actuating means 88 and forces the diaphragm 99 downwardly closing the contact 91 and 93. This closes the circuit to battery 108 and reversible motor 109 which combines to rotate the vernier jet nozzle 73 downwardly in order to decrease the angle of attack and bring the missle into its proper alignment. The jet nozzle is mounted on a horizontal stabilizer 110, or anywhere that the design engineer desires for best control. When the missile is moved back in its proper alignment by the action of the jet nozzle, the ratio of the pressure measured at orifices 68 and 69 respectively will return to the proper ratio and air will stop flowing through the connecting conduit 106 into the portion 80 because the portion 80 will take up a pressure equal to the pressure in the constant area portion 101.

If the angle of attack became less than the designed angle just the opposite action would result. In this case the oblique shock 70 would move closer to the face of the wedge probe 66 causing the pressure at orifice 68 to increase and conversely the oblique shock 71 would move away from the face and the pressure at orifice 69 would decrease. This would change the ratio of the two measured pressures from the predetermined ratio which it is desired to maintain. In this case the converse of the previously described operation will happen. The normal shock 84 will tend to remain at its same position because the pressure in the portion 80 will increase to compensate for the increased pressure at 68, except for the air which passes out through conduit 106. The pressure in portion 101 will decrease due to the fact that the pressure measured at 69 will decrease and the normal shock 100 would remain in the same position except for the fact that air will flow through the connecting conduit 106 causing the pressure in 101 to increase, moving the normal shock 100 forward across the static orifice 99. This causes the larger static pressure behind the normal shock 100 to be introduced into the actuating means 88 via the tube 104 causing the flexible diaphragm 90 to close the contacts 91 and 92. Such action causes the power source 108 to drive the reversible motor 109 to rotate the vernier jet 73 upwardly to bring the missile back into proper angle of attack. In the example shown the control system is designed to maintain the oblique shocks 70 and 71 at equal angles from the faces of the wedge probe 66, however, it is within the scope of this invention that the wedge probe could have a predetermined angle of attack in which case the pressure measured at orifice 69 would always be a certain percent greater than the pressure measured at orifice 68 or vice-versa.

Although only a few embodiments of the present invention have been shown and described in detail it will be understood to those skilled in the art that various modifications of the basic invention can be made without departing from the spirit of the invention or the scope of the appended claims.

I claim:
1. Means for amplifying a change in the ratio of a first and a second measured quantity comprising a first conduit and a second conduit adapted for gas flow therethrough, each of said conduits having a throat section with a downstream diverging section, first and second quantity sensing means for supplying gas to the upstream side of said throats, respectively, at a pressure which is indicative of the quantity sensed, means located downstream of said throats for causing the gas to flow supersonically along a predetermined part of said diverging sections and generate a normal shock wave in each of said diverging sections, means connecting said first and second conduits downstream of said respective diverging sections for causing said pressure in one of said conduits at that point to tend to equalize with any pressure change in the other of said conduits whereby the normal shock wave in the former conduit is caused to move, and means communicating with each of said diverging sections for sensing the position of the shock wave therein.

2. A pressure control amplifier comprising a first conduit and a second conduit adapted for gas flow therethrough, each of said conduits having a throat section with a downstream diverging section means for supplying a first and a second sensed pressure to the upstream side of the respective throats, means located downstream of said throats for causing said throats to operate in a choked condition and generate a normal shock wave in the gas in said respective diverging sections, a first and a second static orifice opening into said diverging sections respectively, pressure responsive actuating means communicating with said orifices and being sensitive to the difference in pressure in front of and behind a normal shock wave in gas in said diverging sections, means connecting the pressure in said first and second conduits downstream of said respective diverging sections for causing said pressure in one of said conduits at that point to tend to equalize with any pressure change in the other of said conduits whereby the normal shock wave in the former conduit is caused to move and cross the static orifice in said diverging section which will cause said actuating means to respond, power means connected to and actuated by said actuating means for operating a control device.

3. Means for maintaining a predetermined ratio between a first and second sensed quantity comprising a first conduit and a second conduit adapted for gas flow therethrough, each of said conduits having a throat section with a downstream diverging section, a first and a second quantity sensing means for supplying gas at a pressure which is indicative of the quantity sensed to the upstream side of the respective throat, means located downstream of said throats for causing said throats to operate in a choked condition and generate a normal shock wave in gas within said diverging sections, a first and a second static orifice opening into said diverging sections of said first and second conduits respectively, pressure responsive actuating means communicating with said orifices and being sensitive to the difference in pressure in front of and behind a said normal shock wave in gas in said diverging sections, means connecting the pressure in said first and second conduits downstream of said respective diverging sections for causing said pressure in one of said conduits a that point to tend to equalize with any pressure change in the other of said conduits whereby the normal shock wave in the former conduit is caused to move, and power means connected to and actuated by said actuating means for operating a control device, said control device being capable of changing the quantities sensed by said first and second quantity sensing means.

4. A control device comprising: a first and a second conduit; shock wave generating means operatively connected to said first and second conduits for generating and selectively positioning shock waves therein; first and second orifice means operatively connected to said first and second conduits, respectively, for sensing pressure differentials therein; passage means operatively connecting said first and second conduits between said first and second orifice means and said shock wave generating means, respectively; for regulating the pressure therebetween to thereby move said shock waves in said first and second conduits in relative directions opposite to each other; control means operatively connected to said first and second orifice means and adapted to be selectively positioned by pressure differentials sensed by said first and second orifice means.

References Cited in the file of this patent

UNITED STATES PATENTS

| | | |
|---|---|---|
| 2,551,470 | Smith | May 1, 1951 |
| 2,638,738 | Salter | May 19, 1953 |
| 2,737,019 | Billman | Mar. 6, 1956 |
| 2,776,806 | Brendal | Jan. 8, 1957 |
| 2,829,490 | Kresse | Apr. 8, 1958 |
| 2,861,419 | Hausmann | Nov. 25, 1958 |
| 2,864,393 | Drake | Dec. 16, 1958 |
| 2,873,756 | Pool | Feb. 17, 1959 |
| 2,920,446 | Ranard | Jan. 12, 1960 |
| 2,934,898 | Graefe et al. | May 3, 1960 |

FOREIGN PATENTS

| | | |
|---|---|---|
| 220,760 | Australia | July 3, 1958 |
| 709,300 | Great Britain | May 19, 1954 |
| 713,322 | Great Britain | Aug. 11, 1954 |

UNITED STATES PATENT OFFICE
CERTIFICATE OF CORRECTION

Patent No. 3,065,599                                November 27, 1962

Joseph K. Dew

It is hereby certified that error appears in the above numbered patent requiring correction and that the said Letters Patent should read as corrected below.

Column 3, line 36, for "embodinment" read -- embodiment --; column 6, line 11, after "The" insert -- wedge --; column 7, line 37, for "and" read -- of --; column 10, line 10, strike out "a"; line 14, for "a" read -- at --.

Signed and sealed this 4th day of June 1963.

(SEAL)
Attest:

ERNEST W. SWIDER                                 DAVID L. LADD
Attesting Officer                                    Commissioner of Patents